(12) United States Patent
Wei (10) Patent No.: US 9,386,525 B2
(45) Date of Patent: Jul. 5, 2016

(54) METHOD OF HANDLING TRANSFERRING FROM ENERGY-CONSUMING MODE TO ENERGY-SAVING MODE AND RELATED COMMUNICATION DEVICE

(71) Applicant: ACER INCORPORATED, New Taipei (TW)

(72) Inventor: Hung-Yu Wei, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 36 days.

(21) Appl. No.: 13/772,351

(22) Filed: Feb. 21, 2013

(65) Prior Publication Data

US 2013/0279384 A1     Oct. 24, 2013

Related U.S. Application Data

(60) Provisional application No. 61/635,877, filed on Apr. 20, 2012.

(51) Int. Cl.
*H04W 52/02* (2009.01)

(52) U.S. Cl.
CPC ...... *H04W 52/0229* (2013.01); *H04W 52/0258* (2013.01); *H04W 52/0209* (2013.01); *Y02B 60/50* (2013.01)

(58) Field of Classification Search
USPC ............... 370/311, 318, 465; 340/7.32–7.38; 455/343.1–343.6
See application file for complete search history.

(56) References Cited

U.S. PATENT DOCUMENTS

| | | |
|---|---|---|
| 7,392,412 B1 | 6/2008 | Lo |
| 2002/0171178 A1 | 11/2002 | Dean |
| 2002/0172178 A1* | 11/2002 | Suzuki et al. .............. 370/338 |
| 2007/0259673 A1* | 11/2007 | Willars et al. .............. 455/453 |
| 2008/0123527 A1 | 5/2008 | Shahidi |
| 2012/0231747 A1* | 9/2012 | Chen et al. .............. 455/68 |
| 2012/0281561 A1* | 11/2012 | Shukla et al. .............. 370/252 |

FOREIGN PATENT DOCUMENTS

CN        101827435 A        9/2010

\* cited by examiner

*Primary Examiner* — Edan Orgad
*Assistant Examiner* — Saumit Shah
(74) *Attorney, Agent, or Firm* — Winston Hsu; Scott Margo (57) ABSTRACT

A method of handling a transferring from an energy-consuming mode to an energy-saving mode for a communication device in a wireless communication system is disclosed. The method comprises transmitting or receiving a first message of an upper protocol layer; deferring the transferring, if the communication device determines that a second message of the upper protocol layer corresponding to the first message is going to be transmitted or received; and advancing the transferring, if the communication device determines that no message corresponding to the first message is going to be transmitted or received.

22 Claims, 11 Drawing Sheets

METHOD OF HANDLING TRANSFERRING FROM ENERGY-CONSUMING MODE TO ENERGY-SAVING MODE AND RELATED COMMUNICATION DEVICE

CROSS REFERENCE TO RELATED APPLICATIONS

This application claims the benefit of U.S. Provisional Application No. 61/635,877, filed on Apr. 20, 2012 and entitled "Cross-layer Mechanism for Adaptive Energy-Saving in LTE Device", the contents of which are incorporated herein in their entirety.

BACKGROUND OF THE INVENTION

1. Field of the Invention

The present invention relates to a method used in a wireless communication system and related communication device, and more particularly, to a method of handling a transferring from an energy-consuming mode to an energy-saving mode and related communication device.

2. Description of the Prior Art

As more and more network applications (e.g., voice over IP (VoIP), instant messaging, web browsing, etc.) are built or installed in a communication device in nowadays, a large amount of energy is consumed when performing the network applications. A lifetime of a battery in the communication device is greatly reduced, and inconvenience is caused to a user of the communication device. Thus, energy efficiency becomes a key issue for the communication device.

For example, a timer (e.g., inactive timer) is considered in the prior art, to improve the energy efficiency. In detail, operation modes of the communication device are divided into an energy-consuming mode (e.g., active mode, connected mode) and an energy-saving mode (e.g., idle mode, sleep mode). Before the communication device starts to communicate with a network (i.e., transmits or receives messages/packets), the communication device transfers to the energy-consuming mode to receive necessary control signalings and perform necessary initialization procedures (e.g., registration, random access, etc.). Then, the communication device stays in the energy-consuming mode to keep communicating with the network, so as to perform the network applications. If the communication device stops communicating with the network (e.g., stop transmitting and receiving the messages) in the energy-consuming mode, the timer is activated (i.e., starts running). If the timer expires, the communication device determines that no network application is performed and transfers to the energy-saving mode. Thus, the communication device can save the energy to improve the lifetime of the battery. Otherwise, if the communication device communicates with the network again, the timer is stopped and reset.

In this situation, it is important to configure a value of the timer properly. For example, if the value is too small and the communication device does not really finish the network applications, the communication device needs to transfer back to the energy-consuming mode to communicate with the network. Then, it is possible that the communication device transfers between the energy-consuming mode and the energy-saving mode frequently, and energy of the battery is wasted due to frequent transferring. Oppositely, if the value is too large and the communication device has finished the network applications, the communication device will stay in the energy-consuming mode for a long time before the timer expires. Thus, the energy is wasted due to that the communication device continues to receive the control signalings and perform related procedures. Besides, since the network applications performed by the communication device are diverse, properties such as frequencies of performing the network applications, durations within which the network applications are performed, amounts of messages (e.g., signalings) generated by the network applications, etc., are also diverse. Thus, it is difficult to configure the value of the timer properly. How to save the energy efficiently is thus a topic to be discussed.

SUMMARY OF THE INVENTION

The present invention therefore provides a method and related communication device for handling a transferring from an energy-consuming mode to an energy-saving mode to solve the abovementioned problems.

A method of handling a transferring from an energy-consuming mode to an energy-saving mode for a communication device in a wireless communication system is disclosed. The method comprises transmitting or receiving a first message of an upper protocol layer; deferring the transferring, if the communication device determines that a second message of the upper protocol layer corresponding to the first message is going to be transmitted or received; and advancing the transferring, if the communication device determines that no message corresponding to the first message is going to be transmitted or received.

A method of handling a transferring from an energy-consuming mode to an energy-saving mode for a communication device in a wireless communication system is disclosed. The method comprises performing a first session of an upper protocol layer; deferring the transferring, if the communication device determines that a second session of the upper protocol layer corresponding to the first session is going to be performed; and advancing the transferring, if the communication device determines that no session corresponding to the first session is going to be performed.

A communication device in a wireless communication system for handling a transferring from an energy-consuming mode to an energy-saving mode is disclosed. The communication device comprises means for transmitting or receiving a first message of an upper protocol layer; means for deferring the transferring, if the communication device determines that a second message of the upper protocol layer corresponding to the first message is going to be transmitted or received; and means for advancing the transferring, if the communication device determines that no message corresponding to the first message is going to be transmitted or received.

A communication device in a wireless communication system for handling a transferring from an energy-consuming mode to an energy-saving mode is disclosed. The communication device comprises means for performing a first session of an upper protocol layer; means for deferring the transferring, if the communication device determines that a second session of the upper protocol layer corresponding to the first session is going to be performed; and means for advancing the transferring, if the communication device determines that no session corresponding to the first session is going to be performed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
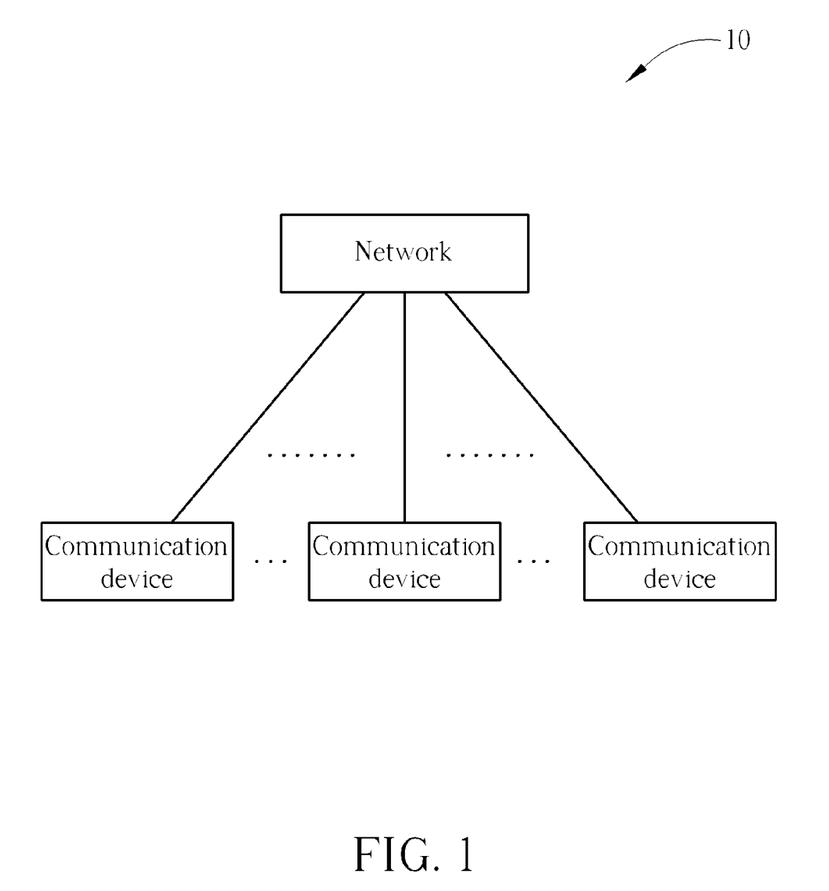
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be mobile phones, laptops, tablet computers, electronic books, portable computer systems, and machine-type communication (MTC) devices. The communication devices can also be referred to mobile stations (MSs) or user equipments (UEs) in the UMTS, the LTE system or the LTE-A system. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
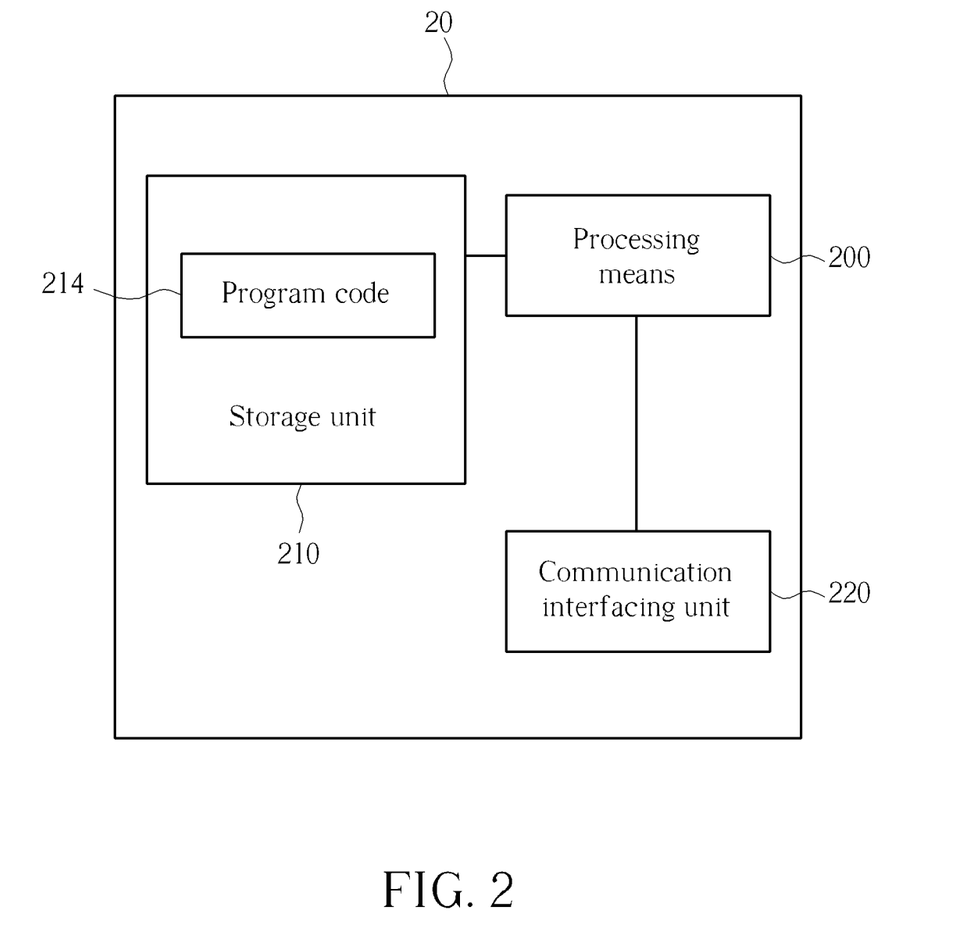
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
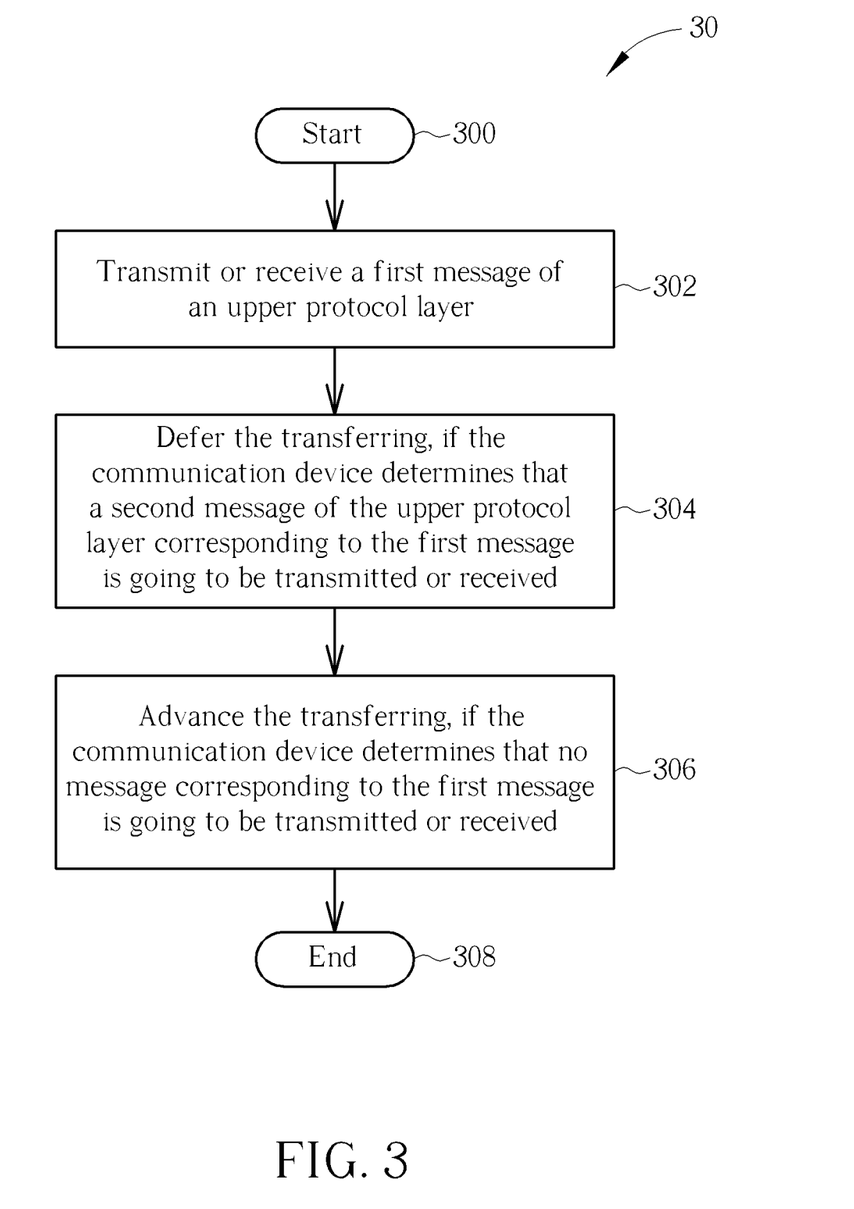
FIG. 3 is a flowchart of a process according to an example of the present invention.

Please refer to FIG. 3, which is a flowchart of a process 30 according to an example of the present invention. The process 30 is utilized in a communication device shown in FIG. 1, for handling a transferring from an energy-consuming mode to an energy-saving mode. The process 30 may be compiled into the program code 214 and includes the following steps:

Step 300: Start.

Step 302: Transmit or receive a first message of an upper protocol layer.

Step 304: Defer the transferring, if the communication device determines that a second message of the upper protocol layer corresponding to the first message is going to be transmitted or received.

Step 306: Advance the transferring, if the communication device determines that no message corresponding to the first message is going to be transmitted or received.

Step 308: End.

According to the process 30, after the communication device transmits or receives a first message of an upper protocol layer, the communication device defers the transferring, if the communication device determines that a second message of the upper protocol layer corresponding to the first message is going to be transmitted or received, and advances the transferring, if the communication device determines that no message corresponding to the first message is going to be transmitted or received. That is, the communication device can transfer to the energy-saving mode earlier to save energy of a battery of the communication device, if there is no successive message following the first message to be transmitted or received. Oppositely, the communication device can transfer to the energy-saving mode later to wait for the second message, if the second message is going to be transmitted or received soon (e.g., within a certain time interval). Thus, frequent transferring between the energy-consuming mode and the energy-saving mode can be avoided, and the energy for the transferring between the energy-consuming mode and the energy-saving mode can be saved. Thus, the energy of the battery can be saved efficiently according to whether the communication device is going to transmit or receive a successive message of an upper protocol layer corresponding to a message of the upper protocol layer currently processed (i.e., transmitted/received).

Please note that, a spirit of the process 30 is that a communication device defers or advances a transferring from an energy-consuming mode to an energy-saving mode according to whether the communication device is going to transmit or receive a message of an upper protocol layer soon, to save energy for waiting for the transferring and the energy for frequent transferring between the energy-consuming mode and the energy-saving mode. Realization of the process 30 is not limited.

For example, the transferring can be performed by the communication device at a lower protocol layer comprising at least one of a physical layer and a medium access control (MAC) layer. That is, the energy-consuming mode and the energy-saving mode are operation modes of the physical layer and/or the MAC layer, since the communication device usually consumes more energy when performing operations related to the physical layer and/or the MAC layer. Thus, the transferring between the energy-consuming mode and the energy-saving mode used for saving the energy can be performed at the physical layer and/or the MAC layer.

Besides, a method based on which the communication device defers and advances the transferring (from the energy-consuming mode to the energy-saving mode) is not limited. For example, the communication device can defer the transferring by increasing a value of an inactivity timer, and can advance the transferring by decreasing the value of the inactivity timer. That is, the communication device defers the transferring by making the inactivity timer expires later, and advances the transferring by making the inactivity timer expires earlier.

Furthermore, the upper protocol layer can be a transport layer or an application layer, i.e., protocol layers above a network layer. More specifically, the message mentioned above can be a transmission control protocol (TCP) message of the transport layer, or can be a session initiation protocol (SIP) message or a hypertext transfer protocol (HTTP) message of the application layer, and is not limited herein.

Figure 4:
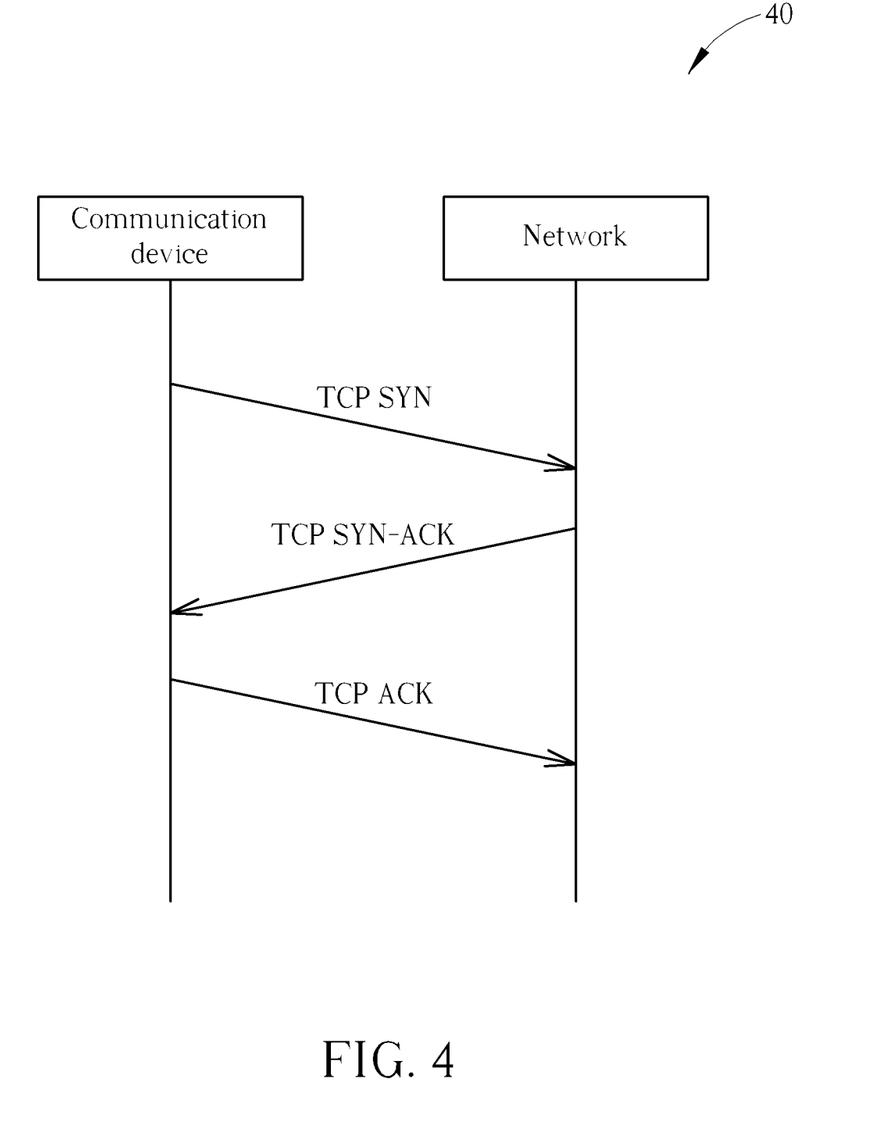
FIG. 4 is a schematic diagram of a flowchart according to an example of the present invention.

Please refer to FIG. 4, which is a schematic diagram of a flowchart 40 according to an example of the present invention. The flowchart 40 is used for explaining a TCP initialization (i.e., handshake) procedure performed by the communication device and the network at the transport layer. As shown in FIG. 4, the communication device transmits a TCP SYN message to the network at the beginning, e.g., for initializing a TCP session. Then, the communication device can defer the transferring from the energy-consuming mode to the energy-saving mode (e.g., configure an inactivity timer with a larger value), since the communication device is going to receive a TCP SYN-ACK message for replying the TCP SYN message from the network. Thus, even if the TCP SYN-ACK message is delayed (e.g., due to network congestion), the communication device will not transfer to the energy-saving mode erroneously. After the communication device receives the TCP SYN-ACK message, the communication device transmits a TCP ACK message to the network for confirming the TCP SYN-ACK message. Then, the communication device can advance the transferring from the energy-consuming mode to the energy-saving mode (e.g., configure an inactivity timer with a smaller value), since the TCP initialization procedure is completed and the communication device is unlikely to transmit or receive a message again within a certain time interval. That is, the TCP ACK message can be seen as an ending message implying that no message is to be transmitted or received within the certain time interval. Thus, the communication device can save energy of a battery for waiting for transferring to the energy-saving mode.

Figure 5:
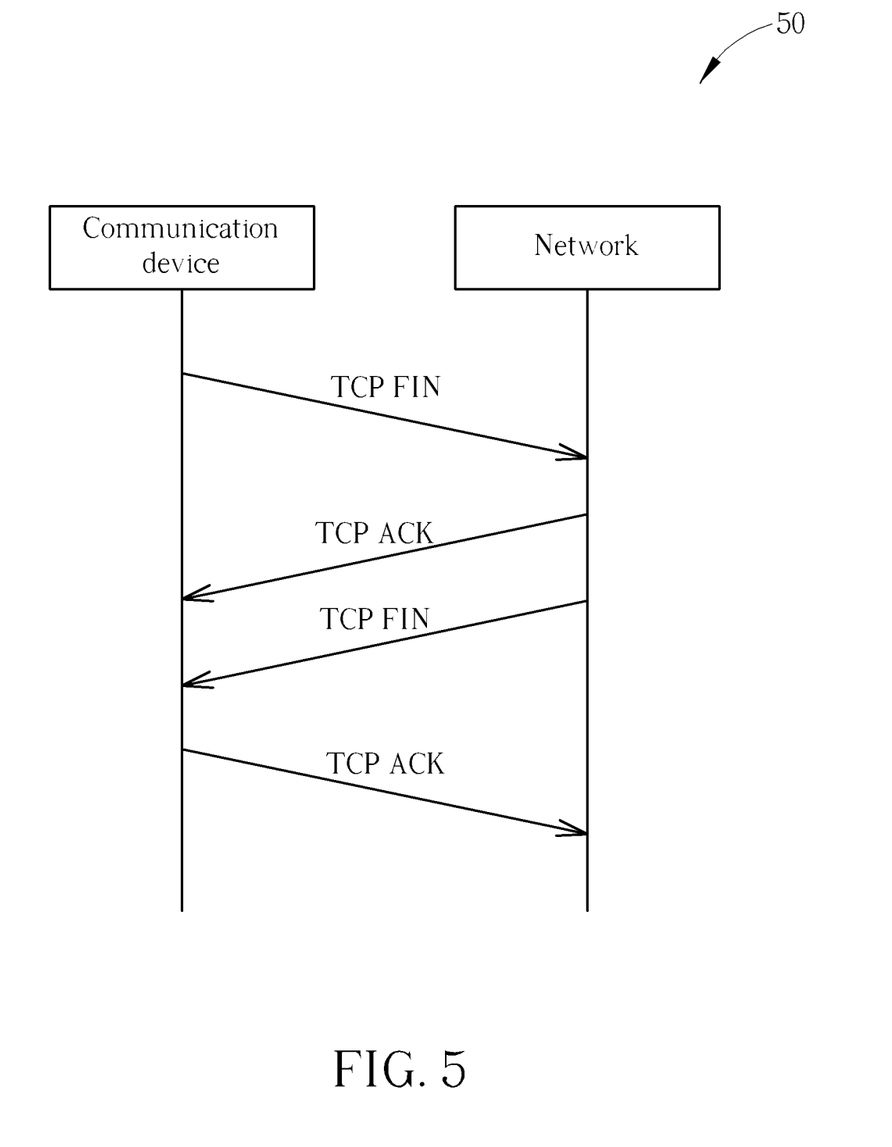
FIG. 5 is a schematic diagram of a flowchart according to an example of the present invention.

Similarly, please refer to FIG. 5, which is a schematic diagram of a flowchart 50 according to an example of the present invention. The flowchart 50 is used for explaining a TCP termination (i.e., handshake) procedure performed by the communication device and the network at the transport layer. As shown in FIG. 5, the communication device transmits a first TCP FIN message to the network at the beginning, e.g., for terminating a TCP session. Then, the communication device can defer the transferring from the energy-consuming mode to the energy-saving mode (e.g., configure an inactivity timer with a larger value), since the communication device is going to receive a second TCP FIN message and a first TCP ACK message for replying the first TCP FIN message from the network. Thus, even if the second TCP FIN message and/or the first TCP ACK message is delayed (e.g., due to the network congestion), the communication device will not transfer to the energy-saving mode erroneously. After the communication device receives the second TCP FIN message and the first TCP ACK message, the communication device transmits a second TCP ACK message to the network for confirming the second TCP FIN message. Then, the communication device can advance the transferring from the energy-consuming mode to the energy-saving mode (e.g., configure an inactivity timer with a smaller value), since the TCP termination procedure is completed and the communication device is unlikely to transmit or receive a message again within a certain time interval. That is, the second TCP ACK message can be seen as an ending message implying that no message is to be transmitted or received within the certain time interval. Thus, the communication device can save the energy of the battery for waiting for transferring to the energy-saving mode.

Figure 6:
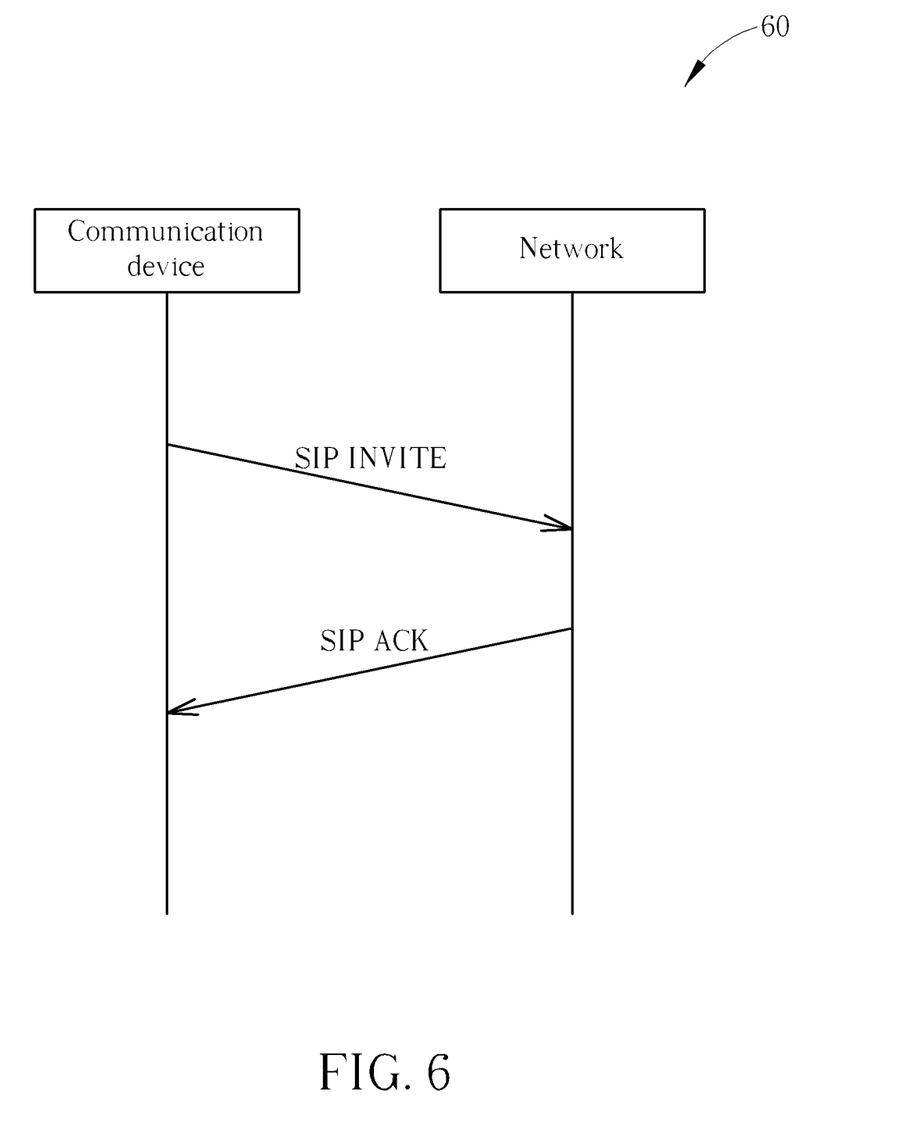
FIG. 6 is a schematic diagram of a flowchart according to an example of the present invention.

Please refer to FIG. 6, which is a schematic diagram of a flowchart 60 according to an example of the present invention. The flowchart 60 is used for explaining a SIP initialization (e.g., voice over IP (VoIP)) procedure performed by the communication device and the network at the application layer. As shown in FIG. 6, the communication device transmits a SIP invite message to the network at the beginning, e.g., for initiating a SIP session. Then, the communication device can defer the transferring from the energy-consuming mode to the energy-saving mode (e.g., configure an inactivity timer with a larger value), since the communication device is going to receive a SIP ACK message for replying the SIP invite message from the network. Thus, even if the SIP ACK message is delayed (e.g., due to the network congestion), the communication device will not transfer to the energy-saving mode erroneously. After the communication device receives the SIP ACK message, the communication device can advance the transferring from the energy-consuming mode to the energy-saving mode (e.g., configure an inactivity timer with a smaller value), since the SIP initialization procedure is completed and the communication device is unlikely to transmit or receive a message again within a certain time interval. That is, the SIP ACK message can be seen as an ending message implying that no message is to be transmitted or received within the certain time interval. Thus, the communication device can save the energy of the battery for waiting for transferring to the energy-saving mode.

Figure 7:
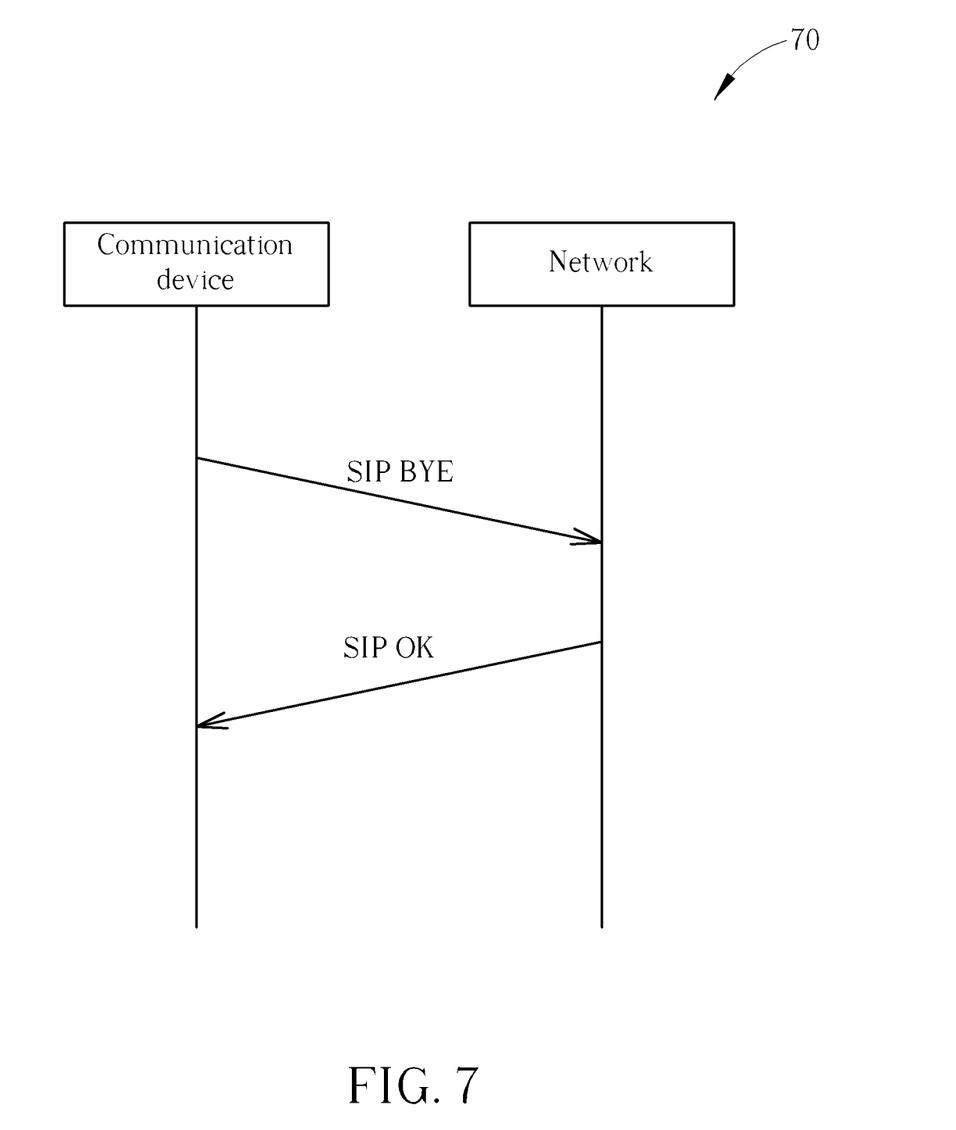
FIG. 7 is a schematic diagram of a flowchart according to an example of the present invention.

Similarly, please refer to FIG. 7, which is a schematic diagram of a flowchart 70 according to an example of the present invention. The flowchart 70 is used for explaining a SIP termination procedure performed by the communication device and the network at the application layer. As shown in FIG. 7, the communication device transmits a SIP BYE message to the network at the beginning, e.g., for terminating a SIP session. Then, the communication device can defer the transferring from the energy-consuming mode to the energy-saving mode (e.g., configure an inactivity timer with a larger value), since the communication device is going to receive a SIP OK message for replying the SIP BYE message from the network. Thus, even if the SIP OK message is delayed (e.g., due to the network congestion), the communication device will not transfer to the energy-saving mode erroneously. After the communication device receives the SIP OK message, the communication device can advance the transferring from the energy-consuming mode to the energy-saving mode (e.g., configure an inactivity timer with a smaller value), since the SIP termination procedure is completed and the communication device is unlikely to transmit or receive a message again within a certain time interval. That is, the SIP OK message can be seen as an ending message implying that no message is to be transmitted or received within the certain time interval. Thus, the communication device can save the energy of the battery for waiting for transferring to the energy-saving mode.

Figure 8:
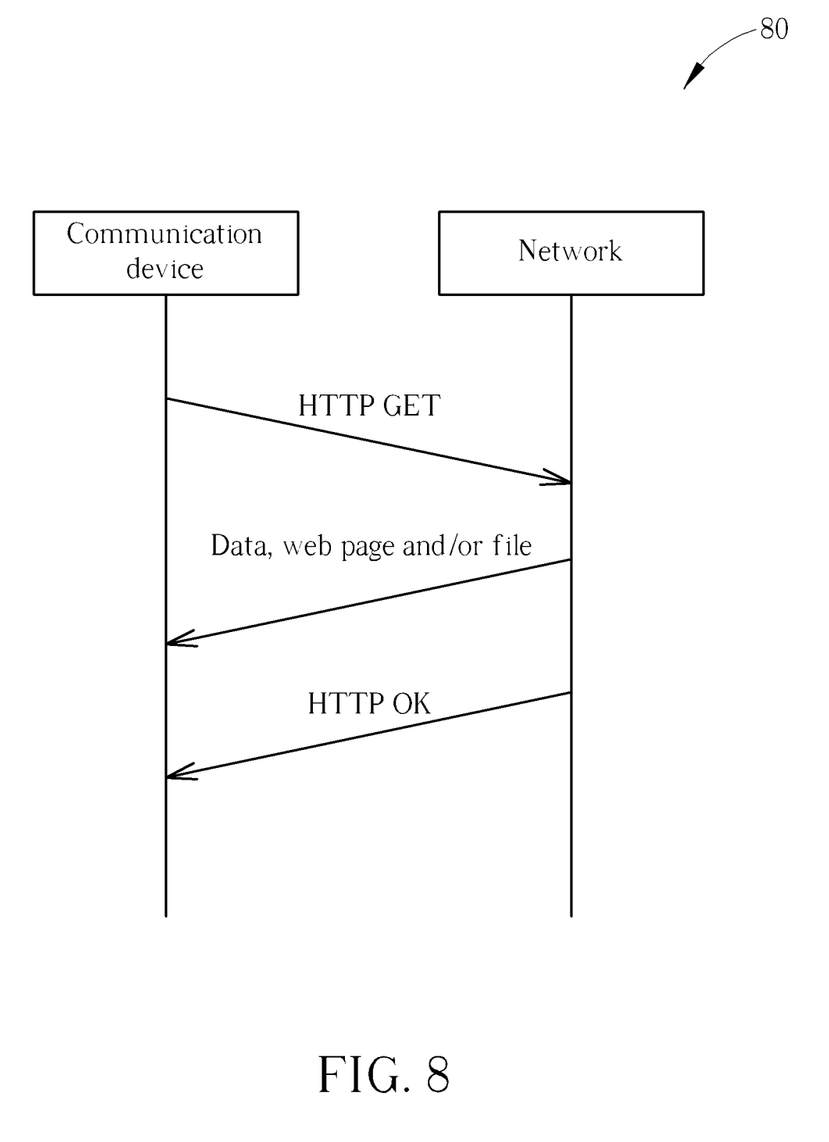
FIG. 8 is a schematic diagram of a flowchart according to an example of the present invention.

Similarly, please refer to FIG. 8, which is a schematic diagram of a flowchart 80 according to an example of the present invention. The flowchart 80 is used for explaining a hypertext transfer protocol (HTTP) procedure performed by the communication device and the network at the application layer. As shown in FIG. 8, the communication device transmits a HTTP GET message to the network at the beginning, e.g., for retrieving data, a web page and/or a file. The communication device can defer the transferring from the energy-consuming mode to the energy-saving mode (e.g., configure an inactivity timer with a larger value), since the communication device is going to receive the data, the web page and/or the file from the network. Thus, even if the data, the web page and/or the file is retrieved intermittently (e.g., due to traffic characteristics), the communication device will not transfer to the energy-saving mode erroneously. After the communication device receives the data, the web page and/or the file, the communication device continues to wait for a HTTP OK message. In this situation, the communication device can defer the transferring again (since the inactivity timer may be reset), to avoid transferring to the energy-saving mode erroneously. After receiving the HTTP OK message, the communication device can advance the transferring from the energy-consuming mode to the energy-saving mode (e.g., configure an inactivity timer with a smaller value), since the HTTP procedure is completed and the communication device is unlikely to transmit or receive a message again within a certain time interval. That is, the HTTP OK message can be seen as an ending message implying that no message is to be transmitted or received within the certain time interval. Thus, the communication device can save the energy of the battery for waiting for transferring to the energy-saving mode.

Figure 9:
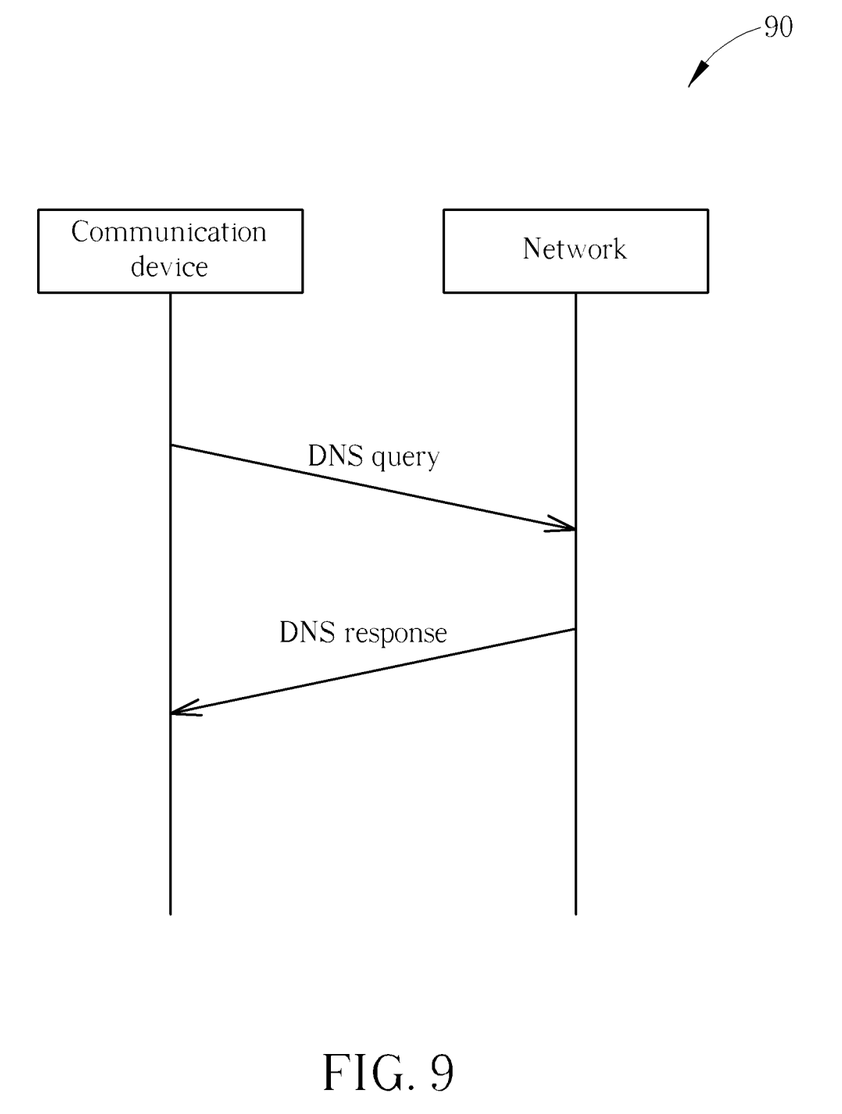
FIG. 9 is a schematic diagram of a flowchart according to an example of the present invention.

Similarly, please refer to FIG. 9, which is a schematic diagram of a flowchart 90 according to an example of the present invention. The flowchart 90 is used for explaining a domain name system (DNS) procedure performed by the communication device and the network at the application layer. As shown in FIG. 9, the communication device transmits a DNS query message to the network at the beginning, e.g., for querying a domain name or an Internet protocol (IP) address. Then, the communication device can defer the transferring from the energy-consuming mode to the energy-saving mode (e.g., configure an inactivity timer with a larger value), since the communication device is going to receive a DNS response message (e.g., including the domain name or the IP address) for replying the DNS query message from the network. Thus, even if the DNS response message is delayed (e.g., due to the network congestion), the communication device will not transfer to the energy-saving mode erroneously. After the communication device receives the DNS response message, the communication device can advance the transferring from the energy-consuming mode to the energy-saving mode (e.g., configure an inactivity timer with a smaller value), since the DNS procedure is completed and the communication device is unlikely to transmit or receive a message again within a certain time interval. That is, the DNS response message can be seen as an ending message implying that no message is to be transmitted or received within the certain time interval. Thus, the communication device can save the energy of the battery for waiting for transferring to the energy-saving mode.

Thus, according to the process 30 and the above description, the energy of the battery can be saved efficiently according whether the communication device is going to transmit or receive a successive message of an upper protocol layer corresponding to a message of the upper protocol layer currently processed (i.e., transmitted/received).

Figure 10:
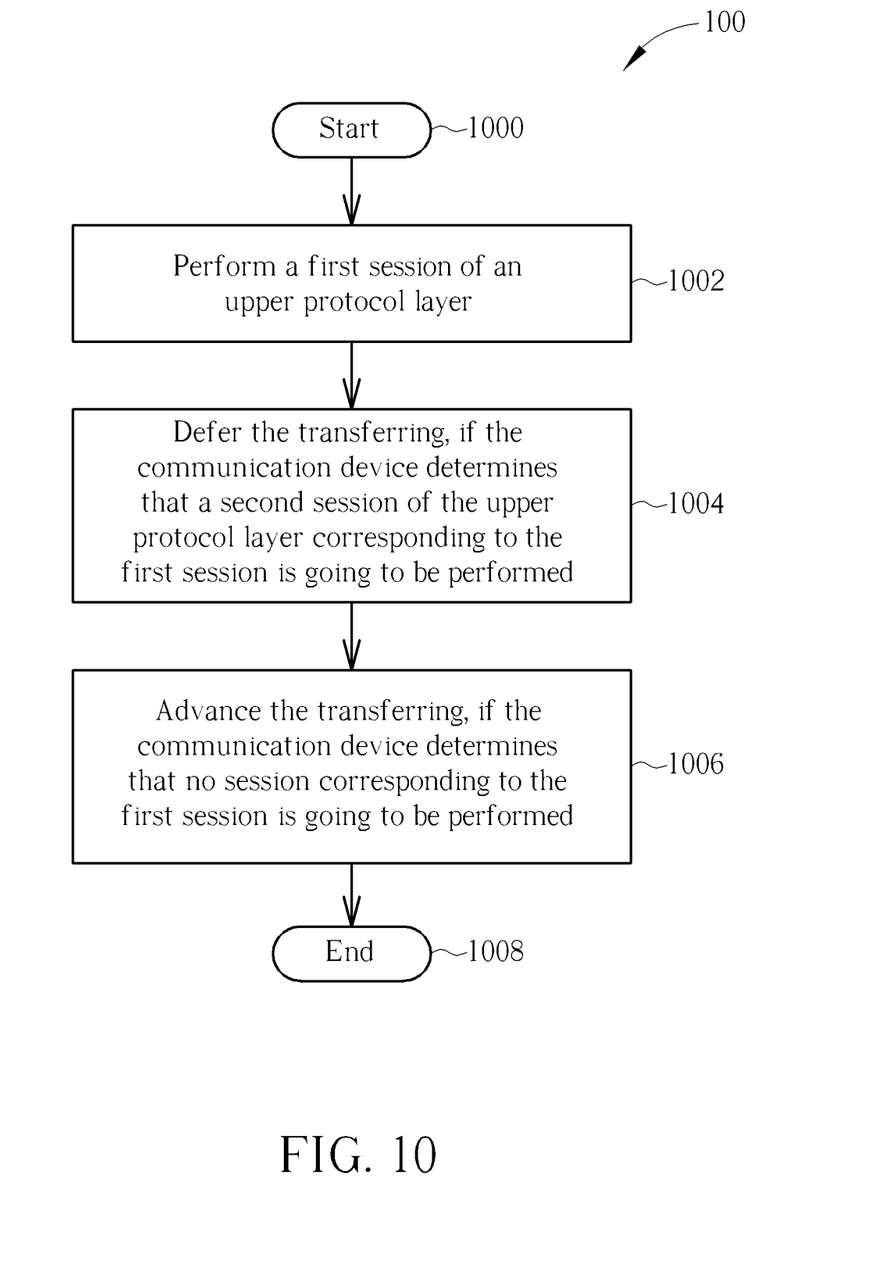
FIG. 10 is a schematic diagram of a flowchart according to an example of the present invention.

Please refer to FIG. 10, which is a flowchart of a process 100 according to an example of the present invention. The process 100 is utilized in a communication device shown in FIG. 1, for handling a transferring from an energy-consuming mode to an energy-saving mode. The process 100 may be compiled into the program code 214 and includes the following steps:

Step 1000: Start.

Step 1002: Perform a first session of an upper protocol layer.

Step 1004: Defer the transferring, if the communication device determines that a second session of the upper protocol layer corresponding to the first session is going to be performed.

Step 1006: Advance the transferring, if the communication device determines that no session corresponding to the first session is going to be performed.

Step 1008: End.

According to the process 100, after the communication device performs a first session of an upper protocol layer, the communication device defers the transferring, if the communication device determines that a second session of the upper protocol layer corresponding to the first session is going to be performed, and advances the transferring, if the communication device determines that no session corresponding to the first session is going to be performed. That is, the communication device can transfer to the energy-saving mode earlier to save energy of a battery of the communication device, if there is no successive session following the first session to be performed. Oppositely, the communication device can transfer to the energy-saving mode later to wait for performing the second session, if the second session is going to be performed soon (i.e., within a certain time interval). Thus, frequent transferring between the energy-consuming mode and the energy-saving mode can be avoided, and the energy for the transferring between the energy-consuming mode and the energy-saving mode can be saved. Note that when the communication device performs a session, it means that the communication device transmits or receives one or more messages during the session. Thus, the energy of the battery can be saved efficiently according whether the communication device is going to perform a successive session of an upper protocol layer corresponding to a session of the upper protocol layer currently performed.

Please note that, a spirit of the process 100 is that a communication device defers or advances a transferring from an energy-consuming mode to an energy-saving mode according to whether the communication device is going to perform a session of an upper protocol layer soon, to save energy for waiting for the transferring and the energy for frequent transferring between the energy-consuming mode and the energy-saving mode. Realization of the process 100 is not limited.

For example, the transferring can be performed by the communication device at a lower protocol layer comprising at least one of a physical layer and a medium access control (MAC) layer. That is, the energy-consuming mode and the energy-saving mode are operation modes of the physical layer and/or the MAC layer, since the communication device usually consumes more energy when performing operations related to the physical layer and/or the MAC layer. Thus, the transferring between the energy-consuming mode and the energy-saving mode used for saving the energy can be performed at the physical layer and/or the MAC layer.

Besides, a method based on which the communication device defers and advances the transferring (from the energy-consuming mode to the energy-saving mode) is not limited. For example, the communication device can defer the transferring by increasing a value of an inactivity timer, and can advance the transferring by decreasing the value of the inactivity timer. That is, the communication device defers the transferring by making the inactivity timer expires later, and advances the transferring by making the inactivity timer expires earlier.

Furthermore, the upper protocol layer can be a transport layer or an application layer, i.e., protocol layers above a network layer. More specifically, the session mentioned above can be a transmission control protocol (TCP) session of the transport layer, wherein one or more TCP messages are transmitted and/or received during the TCP session. Alternatively, the session can be a session initiation protocol (SIP) session or a hypertext transfer protocol (HTTP) session of the application layer, wherein one or more SIP/HTTP messages are transmitted and/or received during the SIP session or the HTTP session. In another example, the session can be a DNS session of the application layer, wherein one or more DNS query messages and one or more DNS response messages are exchanged. Besides, the session is not limited to those mentioned above.

Figure 11:
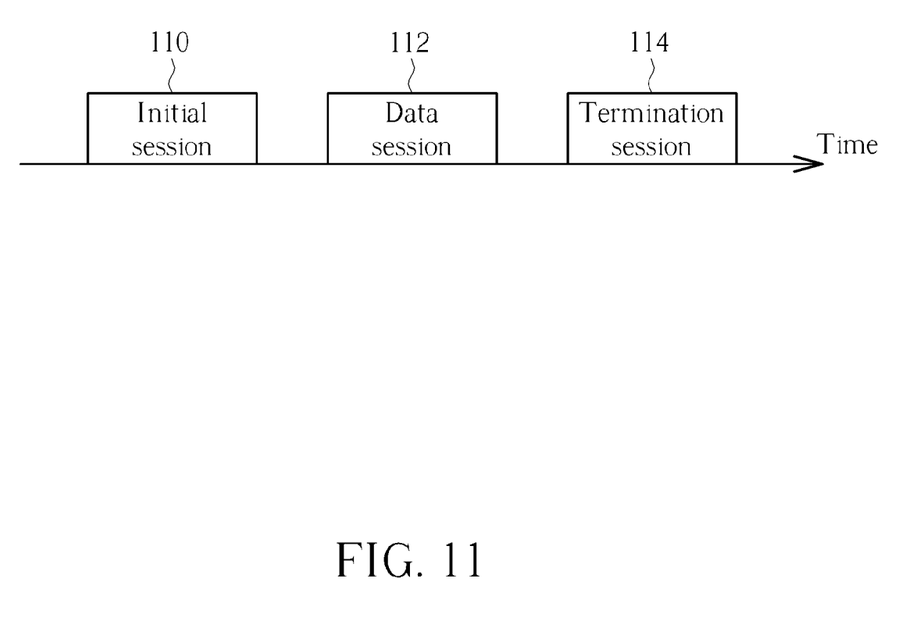
FIG. 11 is a schematic diagram of sessions performed by the communication device according to an example of the present invention.

Please refer to FIG. 11, which is a schematic diagram of sessions performed by the communication device according to an example of the present invention, wherein the sessions can be TCP sessions, SIP sessions, DNS sessions or HTTP sessions. In detail, there are an initial session 110, a data session 112 (e.g., for retrieving data, a web page and/or a file) and a termination session 114 in FIG. 11. The communication device transmits or receives one or more messages in each of these sessions. Note that the data session 112 is simply used for illustration, and more data sessions are possible within the initial session 110 and the termination session 114. As shown in FIG. 11, the communication device performs an initial session (e.g., with the network) at the beginning. After performing the initial session, the communication device can defer the transferring from the energy-consuming mode to the energy-saving mode (e.g., configure an inactivity timer with a larger value), since the communication device is going to perform the data session 112. Thus, even if the data session 112 cannot be performed immediately (e.g., due to network congestion), the communication device will not transfer to the energy-saving mode erroneously. After the communication device performs the termination session 114, the communication device can advance the transferring from the energy-consuming mode to the energy-saving mode (e.g., configure an inactivity timer with a smaller value), since the termination session implies that no session is to be performed within a certain time interval. Thus, the communication device can save energy of a battery for waiting for transferring to the energy-saving mode.

Thus, according to the process 100 and the above description, the energy of the battery can be saved efficiently according whether the communication device is about to perform a successive session of an upper protocol layer corresponding to a session of the upper protocol layer currently performed.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling a transferring from an energy-consuming mode to an energy-saving mode and related communication device. The communication device defers or advances the transferring according to whether the communication device is going to process a message (or a session) of an upper protocol layer soon, to save energy for waiting for the transferring and the energy for frequent transferring between the energy-consuming mode and the energy-saving mode. Thus, the energy of the battery can be saved efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a transferring from an energy-consuming mode to an energy-saving mode for a communication device in a wireless communication system, the method comprising:
   transmitting or receiving, by the communication device, a first message of an upper protocol layer;
   deferring the transferring, by the communication device, if the communication device determines that a second message of the upper protocol layer corresponding to the first message is going to be transmitted or received; and
   advancing the transferring, by the communication device, if the communication device determines that no message corresponding to the first message is going to be transmitted or received;
   wherein the upper protocol layer comprises a transport layer or an application layer;
   wherein the communication device determines that no message corresponding to the first message is going to be transmitted or received, when the first message is an ending message in a procedure;
   wherein the communication device determines that the second message corresponding to the first message is going to be transmitted or received, when the first message is an initial message triggering at least one successive message.

2. The method of claim 1, wherein the transferring is performed by the communication device at a lower protocol layer comprising at least one of a physical layer and a medium access control (MAC) layer.

3. The method of claim 1, wherein the communication device defers the transferring by increasing a value of an inactivity timer, and advances the transferring by decreasing the value of the inactivity timer.

4. The method of claim 1, wherein the first message is a transmission control protocol (TCP) message, a session initiation protocol (SIP) message, a domain name system (DNS) query message or a hypertext transfer protocol (HTTP) message.

5. A method of handling a transferring from an energy-consuming mode to an energy-saving mode for a communication device in a wireless communication system, the method comprising:
performing, by the communication device, a first session of an upper protocol layer;
deferring the transferring, by the communication device, if the communication device determines that a second session of the upper protocol layer corresponding to the first session is going to be performed; and
advancing the transferring, by the communication device, if the communication device determines that no session corresponding to the first session is going to be performed;
wherein the upper protocol layer comprises a transport layer or an application layer;
wherein the first session comprises a transmission or a reception of one or more messages during the first session;
wherein the communication device determines that no session corresponding to the first session is going to be performed, when the first session is an ending session;
wherein the communication device determines that the second session corresponding to the first session is going to be performed, when the first session is an initial session triggering at least one successive session.

6. The method of claim 5, wherein the transferring is performed by the communication device at a lower protocol layer comprising at least one of a physical layer and a medium access control (MAC) layer.

7. The method of claim 5, wherein the communication device defers the transferring by increasing a value of an inactivity timer, and advances the transferring by decreasing the value of the inactivity timer.

8. The method of claim 5, wherein the first session is a transmission control protocol (TCP) session, a session initiation protocol (SIP) session, a domain name system (DNS) session or a hypertext transfer protocol (HTTP) session.

9. A communication device in a wireless communication system for handling a transferring from an energy-consuming mode to an energy-saving mode, the communication device comprising:
a processing means for executing a program; and
a storage unit coupled to the processing means for storing the program; wherein the program instructs the processing means to perform the following steps:
transmitting or receiving a first message of an upper protocol layer;
deferring the transferring, if the communication device determines that a second message of the upper protocol layer corresponding to the first message is going to be transmitted or received; and
advancing the transferring, if the communication device determines that no message corresponding to the first message is going to be transmitted or received;
wherein the upper protocol layer comprises a transport layer or an application layer;
wherein the communication device determines that no message corresponding to the first message is going to be transmitted or received, when the first message is an ending message in a procedure;
wherein the communication device determines that the second message corresponding to the first message is going to be transmitted or received, when the first message is an initial message triggering at least one successive message.

10. The communication device of claim 9, wherein the transferring is performed by the communication device at a lower protocol layer comprising at least one of a physical layer and a medium access control (MAC) layer.

11. The communication device of claim 9, wherein the communication device defers the transferring by increasing a value of an inactivity timer, and advances the transferring by decreasing the value of the inactivity timer.

12. The communication device of claim 9, wherein the first message is a transmission control protocol (TCP) message, a session initiation protocol (SIP) message, a domain name system (DNS) query message or a hypertext transfer protocol (HTTP) message.

13. A communication device in a wireless communication system for handling a transferring from an energy-consuming mode to an energy-saving mode, the communication device comprising:
a processing means for executing a program; and
a storage unit coupled to the processing means for storing the program; wherein the program instructs the processing means to perform the following steps:
performing a first session of an upper protocol layer;
deferring the transferring, if the communication device determines that a second session of the upper protocol layer corresponding to the first session is going to be performed; and
advancing the transferring, if the communication device determines that no session corresponding to the first session is going to be performed;
wherein the upper protocol layer comprises a transport layer or an application layer;
wherein the first session comprises a transmission or a reception of one or more messages during the first session;
wherein the communication device determines that no session corresponding to the first session is going to be performed, when the first session is an ending session;
wherein the communication device determines that the second session corresponding to the first session is going to be performed, when the first session is an initial session triggering at least one successive session.

14. The communication device of claim 13, wherein the transferring is performed by the communication device at a lower protocol layer comprising at least one of a physical layer and a medium access control (MAC) layer.

15. The communication device of claim 13, wherein the communication device defers the transferring by increasing a value of an inactivity timer, and advances the transferring by decreasing the value of the inactivity timer.

16. The communication device of claim 13, wherein the first session is a transmission control protocol (TCP) session, a session initiation protocol (SIP) session, a domain name system (DNS) session or a hypertext transfer protocol (HTTP) session.

17. A method of handling a transferring from an energy-consuming mode to an energy-saving mode for a communication device in a wireless communication system, the method comprising:
transmitting or receiving, by the communication device, a first message of an upper protocol layer;
deferring the transferring, by the communication device, if the communication device determines that a second message of the upper protocol layer corresponding to the first message is going to be transmitted or received; and advancing the transferring, by the communication device, if the communication device determines that no message corresponding to the first message is going to be transmitted or received;

wherein the upper protocol layer comprises a transport layer or an application layer;

wherein the transferring is performed by the communication device at a lower protocol layer comprising at least one of a physical layer and a medium access control (MAC) layer;

wherein the communication device determines that no message corresponding to the first message is going to be transmitted or received, when the first message is an ending message in a procedure;

wherein the communication device determines that the second message corresponding to the first message is going to be transmitted or received, when the first message is an initial message triggering at least one successive message.

18. The method of claim 17, wherein the communication device defers the transferring by increasing a value of an inactivity timer, and advances the transferring by decreasing the value of the inactivity timer.

19. The method of claim 17, wherein the first message is a transmission control protocol (TCP) message, a session initiation protocol (SIP) message, a domain name system (DNS) query message or a hypertext transfer protocol (HTTP) message.

20. A communication device in a wireless communication system for handling a transferring from an energy-consuming mode to an energy-saving mode, the communication device comprising:

a processing means for executing a program; and a storage unit coupled to the processing means for storing the program; wherein the program instructs the processing means to perform the following steps:

transmitting or receiving a first message of an upper protocol layer;

deferring the transferring, if the communication device determines that a second message of the upper protocol layer corresponding to the first message is going to be transmitted or received; and advancing the transferring, if the communication device determines that no message corresponding to the first message is going to be transmitted or received;

wherein the upper protocol layer comprises a transport layer or an application layer;

wherein the transferring is performed by the communication device at a lower protocol layer comprising at least one of a physical layer and a medium access control (MAC) layer;

wherein the communication device determines that no message corresponding to the first message is going to be transmitted or received, when the first message is an ending message in a procedure;

wherein the communication device determines that the second message corresponding to the first message is going to be transmitted or received, when the first message is an initial message triggering at least one successive message.

21. The communication device of claim 20, wherein the communication device defers the transferring by increasing a value of an inactivity timer, and advances the transferring by decreasing the value of the inactivity timer.

22. The communication device of claim 20, wherein the first message is a transmission control protocol (TCP) message, a session initiation protocol (SIP) message, a domain name system (DNS) query message or a hypertext transfer protocol (HTTP) message.

* * * * *